United States Patent [19]

Raines

[11] Patent Number: 4,466,601

[45] Date of Patent: Aug. 21, 1984

[54] HOLDING FIXTURE FOR DRILLING OBLIQUE HOLES

[76] Inventor: James G. Raines, 11144 Valle Vista Rd., Lakeside, Calif. 92040

[21] Appl. No.: 535,204

[22] Filed: Sep. 23, 1983

Related U.S. Application Data

[63] Continuation of Ser. No. 375,451, May 6, 1982, abandoned.

[51] Int. Cl.³ .............................................. B23Q 3/00
[52] U.S. Cl. ..................................... 269/79; 269/294; 269/303; 248/455; 408/109
[58] Field of Search ............... 269/79, 87.3, 294, 303; 248/465, 463, 455, 456, 174; 408/72 R, 16, 89, 98, 109, 115

[56] References Cited

U.S. PATENT DOCUMENTS

| | | | |
|---|---|---|---|
| 1,207,702 | 12/1916 | Bartholomew | 248/455 |
| 2,027,928 | 1/1936 | Norwood | 248/456 |
| 2,194,019 | 3/1940 | Hartsel | 248/451 |
| 2,401,054 | 5/1946 | Daley | 269/303 |
| 2,633,763 | 4/1953 | Sperling . | |
| 2,771,821 | 11/1956 | Beusch . | |
| 2,787,086 | 4/1957 | Kraus | 248/463 |
| 2,903,920 | 9/1959 | Blecha | 408/115 R |
| 3,019,010 | 1/1962 | Da Costa . | |
| 3,029,548 | 4/1962 | Braha | 248/455 |
| 3,359,836 | 12/1967 | Jalava | 408/109 |
| 3,463,137 | 8/1969 | Hare . | |
| 3,788,633 | 1/1974 | Cho . | |
| 3,991,967 | 11/1976 | Sack | 248/456 |
| 4,295,624 | 10/1981 | Granada | 248/463 |

Primary Examiner—Robert C. Watson
Attorney, Agent, or Firm—Brown & Martin

[57] ABSTRACT

A holding fixture for drilling oblique holes, particularly in frames for table tops, counter tops, cabinets and the like, comprises a base support member for attachment to a drill press table, with a generally L-shaped, upstanding support table pivotally attached to the base support member. An extensible link is connected between the table and the base support member for selectively adjusting the support table to the required angle from the horizontal, to enable the drilling of oblique holes entering one surface of a panel and exiting at an edge thereof.

2 Claims, 4 Drawing Figures

U.S. Patent    Aug. 21, 1984    4,466,601
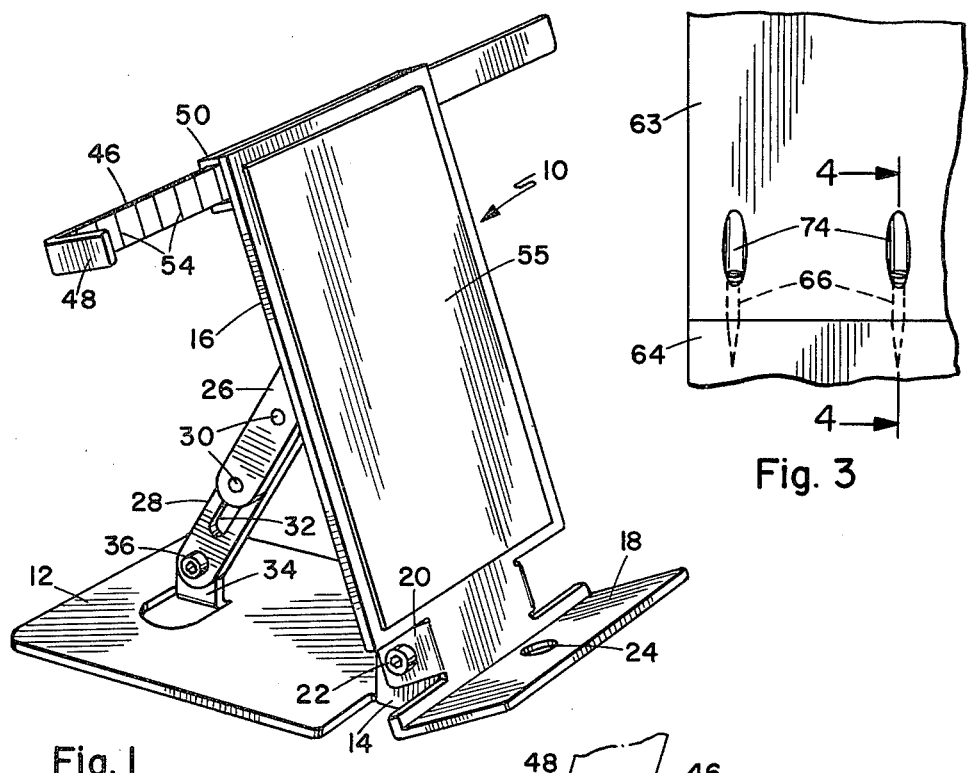
Fig. 1
Fig. 3
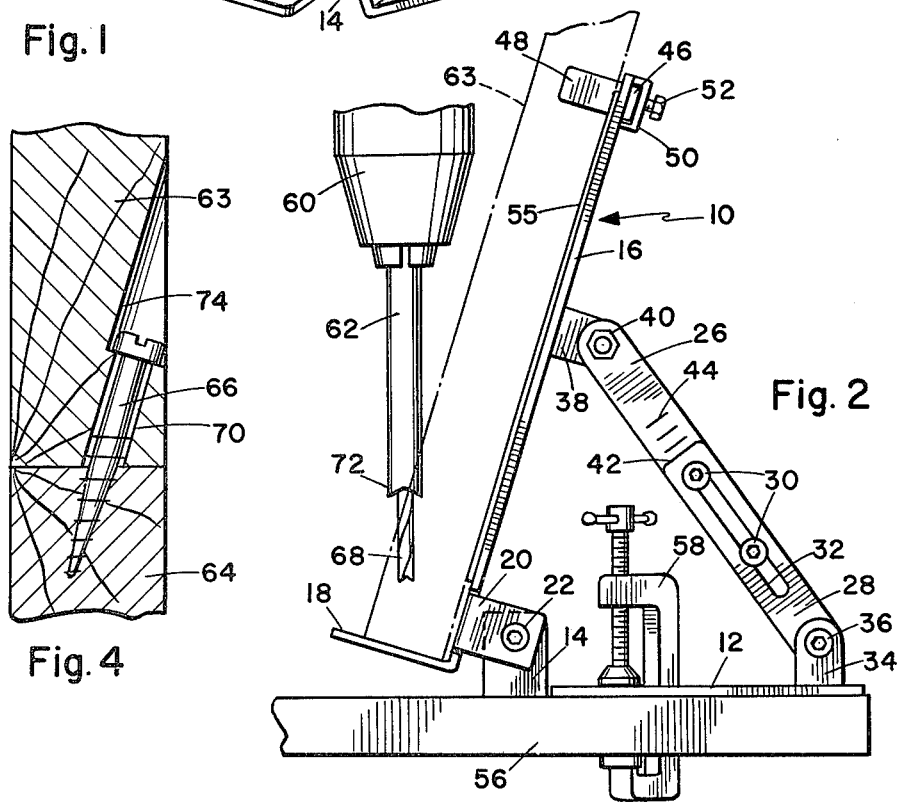
Fig. 4
Fig. 2

HOLDING FIXTURE FOR DRILLING OBLIQUE HOLES

This is a continuation of application Ser. No. 375,451 filed May 6, 1982 now abandoned.

BACKGROUND OF THE INVENTION

The present invention relates to machine fixtures and pertains particularly to a holding fixture for a drill press or the like.

When attaching an edge finishing strip or frame to a surface piece such as a table or counter top, it is well known to use screws extending at an oblique angle through a concealed face of the frame to the edge for holding the frame strip in place. This provides an arrangement so that the attaching device, namely the screw, does not show from the visible surfaces of the table or counter top. This avoids the necessity of filling and refinishing holes, which in many instances cannot be easily hidden.

There are existing machines for drilling such holes. However, such machines are extremely expensive and not practical for purchase or use by the homeowner-hobbyist and small cabinet and carpentry shops.

It is, therefore, desirable that an improved, simple and inexpensive apparatus for enabling the drilling of oblique holes in panels be available.

SUMMARY AND OBJECT OF THE INVENTION

It is the primary object of the present invention to provide an improved fixture for drilling oblique holes in a work piece.

In accordance with the primary aspect of the present invention, a drilling fixture for holding a work piece for drilling oblique holes by means of a drill press, includes a base member for attachment to the drill press table and an adjustable support table, pivotally attached or hinged to the base member for holding and positioning the work piece at a selected angle. Additional improvements include indicia means for indicating the angle of the oblique hole and indicia means for indicating the position of the work piece relative to the drill bit.

BRIEF DESCRIPTION OF THE DRAWINGS

The above and other objects and advantages of the present invention will become apparent from the following description when read in conjunction with the accompanying drawings, wherein:

FIG. 1 is a perspective view of the fixture in accordance with the invention.

FIG. 2 is a side elevation view showing the fixture in position and in use.

FIG. 3 is a partial view showing a portion of a work piece in which oblique holes have been drilled and fitted with retaining screws.

FIG. 4 is an enlarged section view taken on line 4—4 of FIG. 3.

DETAILED DESCRIPTION OF A PREFERRED EMBODIMENT

The fixture, designated generally by the numeral 10, comprises a generally flat rectangular base plate 12 having a pair of pivot brackets 14 bent upwardly from the front edge of the plate 12 at the corners thereof. The support table comprises generally rectangular plate 16, having a footplate 18 extending forwardly at substantially 90 degrees from the plate 16. The table is pivotally mounted by means of a pair of brackets 20, which straddle and are pivotally secured by bolts 22 to the upstanding hinge brackets 14. The brackets 20 are cut from and extend rearwardly from the lower corners of the support table. The footplate 18 includes a clearance hole 24 at the center thereof, to permit a drill bit to pass through and out the edge of the respective work piece without engaging the footplate.

The table 16 is positioned and held in its selected angular position by means of an extensible link comprising an upper link member 26 and a lower link member 28, which are secured together by means of screws 30, which pass through slot 32 in member 28 and are threaded into member 26, for enabling adjustable lengthening or shortening of the link. The link is pivotally secured at its lower end by means of bolt 36 to a bracket 34 on the base plate 12. A bolt 40 secures the upper end of the link member 26 to a bracket 38 on the back of the support table 16. The bracket 34 and 38 may be cut and bent out of the respective base and support elements 12 and 16, to simplify construction. The extensible link preferably includes indicia means as shown in FIG. 2, which comprises a flat end 42 of link 28, which aligns with horizontal marks 44, spaced to indicate the particular angle which the table 18 extends with respect to the horizontal or to plate 12.

This permits selective adjustment of the table to an optimum angle for permitting drilling of the holes for any particular work piece. It has been found that the optimum angle for the type of structure illustrated is about 73 degrees from the horizontal. If the angle is any more than that, the angle of entry of the drill is too shallow and there may not be enough clearance for the drill chuck near the surface of the workpiece, as will be apparent in FIG. 2. Lesser angles can be used, depending on the particular application. For convenience of setting up, the slot 32 may be arranged so that at the full extension of the link members, the support table 16 is at the maximum practical angle relative to the base plate 12, the upper end of the slot acting as a stop for the uppermost locking screw 30. The present fixture is particularly designed and adapted for frame type work pieces such as table posts and rails, counter tops, cabinet face frames and the like.

Position stop and indicia means are provided for selectively positioning the work piece on the table and for selectively positioning it at indicated positions relative to the work table or portions thereof. In particular, the positioning means comprises a generally L-shaped bar 46, having a stop member 48 at one end thereof, slidably mounted within a channel member 50 attached to the rear upper edge of the table member 16. A set screw 52 is threaded through channel 50 to engage and retain the positioning bar in place. Indicia means, in form of scale with markings 54 extending along the face of the positioning member 46, are spaced to indicate a selected position or setting relative to a base reference point such as the edge of the table or the position of the drill bit.

The table may be provided with a non-slip surface or coating 55 which may, for example, be a roughened surface of the table or an attached thin piece or sheet of non-slip coating such as rubber or the like. This aids in holding the panel or work piece on the table without slippage thereof, during work.

In operation, the fixture is positioned on a table 56 of a drill press and clamped or secured in positions such as by a C clamp 58. The drill press, not shown but represented by a drill chuck 60, holds a drill bit 62 for drilling and reaming the appropriate drill holes. The fixture must be positioned to enable the drill bit 62 to enter the surface of the work piece or frame 63 obliquely and pass out of the end thereof, with sufficient clearance from the edge to permit the attachment of the frame 63 to a panel or workpiece 64, as shown in FIGS. 3 and 4. The frame 63 is thus provided with oblique holes through which screws 66 extend into the workpiece 64. This permits the attachment of an edging or molding strip to one surface of the frame 63, leaving the outer surface free of any holes that would require filling and finishing. The drill bit 62 is a special type which will bite into the wood at a shallow angle without sliding off and has a tip portion 68 with a concave cutter and outside cutting edges, which drills a clearance pilot hole 70 for the screw. Behind the tip portion is an enlarged counterbore portion 72 which drills a counterbore 74 for the screw head so that the head is recessed in the frame 63. The drill bit is an available type as used with the specialized machine referred to in the background of the invention.

It is apparent from the above description that I have provided a simple and inexpensive fixture for holding work pieces, particularly panels, for the drilling of oblique holes from a surface thereof through an edge for attachment of molding strips and the like. By bending the various brackets out of their respective elements, the number of parts is greatly reduced and the fixture can be made from stock sizes of material at minimum cost. While I have illustrated and described the invention by means of a single embodiment, it is to be understood that numerous changes and modifications may be made therein, without departing from the spirit and scope of the invention as defined in the appended claims.

I claim:

1. A holding fixture for holding a work piece in a specific angular relation to a drill for drilling an oblique hole in the work piece, the fixture comprising:
   a planar base member attachable to a drill press table;
   an upwardly extending work piece support table pivotally attachable at its lower end to said base member for adjustment about a horizontal axis;
   adjusting means connectable between said support table and said base member for securely holding said support table at a continuously selectable angle relative to said base member within the range of said adjusting means;
   first indicia means on said adjusting means for indicating the selected angle of said support table relative to said base member;
   the lower end of said support table having an integrally formed outwardly extending foot plate substantially perpendicular to said support table for supporting a work piece thereon, the foot plate having a substantially central clearance hole permitting passage of a drill through a work piece;
   a bar member horizontally slidably mounted on the upper portion of said support table;
   said bar member having an outwardly projecting stop, substantially normal to the plane of said support table for engaging a side edge of a work piece mounted on said support table; and
   second indicia means on said bar member for indicating the position of said stop relative to said support table and said clearance hole.

2. The holding fixture of claim 1, further comprising: friction means on said support table for holding the work piece on the table without slipping.

* * * * *